Patented Feb. 6, 1951

2,540,307

UNITED STATES PATENT OFFICE 2,540,307

3,4-DIETHOXYMANDELIC ACID AND PROCESS FOR PREPARING SAME

John Weijlard and Max Tishler, Westfield, N. J., assignors to Merck & Co., Inc., Rahway, N. J., a corporation of New Jersey No Drawing. Application December 9, 1947, Serial No. 790,696

4 Claims. (Cl. 260—473)

This invention is concerned generally with the preparation of 3,4-diethoxymandelic acid and esters thereof, more particularly, it relates to an improved method for the preparation of these compounds employing 3,4-diethoxymandelic acid nitrile as a starting material.

The chemical compounds produced in accordance with our method are useful intermediates in the synthesis of 6,7-diethoxy-1-(3',4'-diethoxybenzyl) isoquinoline, a compound which possesses very valuable therapeutic properties superior to those of papaverine while it is less toxic.

Previous attempts to prepare 3,4-diethoxymandelic acid involved reducing the keto acid with sodium amalgam, a laborious and impractical procedure. The yields obtainable by this method are also very poor.

Regarded in certain of its broader aspects the process in accordance with the present invention involves reacting 3,4-diethoxymandelic acid nitrile with an anhydrous mineral acid such as sulfuric acid and the halogen acids in an absolute lower aliphatic alcohol medium, recovering the 3,4-diethoxymandelic acid alkyl ester thus formed and hydrolyzing the latter compound to 3,4-diethoxymandelic acid. This reaction can be represented graphically as follows:

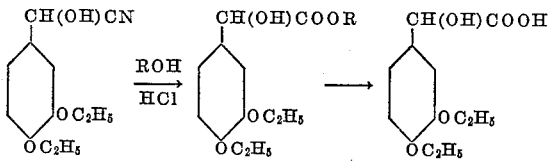

wherein R is an alkyl substituent.

In carrying out the process of the present invention 3,4-diethoxymandelic acid nitrile is reacted with an anhydrous mineral acid such as hydrochloric acid in an absolute alcohol medium. The mixture is allowed to stand at room temperature for a period sufficient to effect reaction. It has been found that the reaction is completed in from 40 to 100 hours, preferably from 60 to 70 hours. After completion of the reaction, hydrochloric acid and alcohol are removed from the reaction mixture by evaporation and the residue is treated with ether. After removing the ether, the residual oil is distilled at about 155–160° C., and 2 mm. pressure and 3,4-diethoxymandelic acid ethyl ester is recovered.

The 3,4-diethoxymandelic acid ethyl ester can be converted to 3,4-diethoxymandelic acid by hydrolyzing the ester in an aqueous alkaline solution at room temperature. The isolation and purification of 3,4-diethoxymandelic acid from solution is accomplished by extracting the aqueous alkaline solution with ether to remove unsaponified substances, then acidulating with hydrochloric acid and collecting the 3,4-diethoxymandelic acid in suitable solvents.

The following example illustrates a method of carrying out the present invention, but it is to be understood that this example is given by way of illustration and not of limitation.

Example

Approximately 195 g. (about 0.88 mole) of 3,4-diethoxymandelic acid nitrile is dissolved in 195 cc. of absolute ethyl alcohol and 400 cc. of 23% alcoholic hydrochloric acid (about 2.5 moles of hydrochloric acid) is added. The mixture is allowed to stand at room temperature for 66 hours. The hydrochloric acid and alcohol are removed by evaporation and the residue is treated with 500 cc. of water. The oil which forms is dissolved in ether and the ether solution washed free of acids with sodium bicarbonate solution and then dried over anhydrous sodium sulphate. After removal of the ether, the residual oil is distilled at about 155–160° C. and 2 mm. pressure. The 3,4-diethoxymandelic acid ethyl ester distillate thus obtained weighed approximately 131 g. (55.5% of theory) and was a water white oil which did not crystallize.

Analysis.—Calculated for $C_{14}H_{20}O_5$: C, 62.67; H, 7.51. Found: C, 63.01; H, 7.59.

Approximately 27 g. (about 0.1 mole) of 3,4-diethoxymandelic acid ethyl ester is mixed with a solution of approximately 4.4 g. (about 0.11 mole) of sodium hydroxide in 130 cc. of water. The mixture is agitated frequently for twenty-four hours at room temperature after which time practically all of the ester disappears. The solution is extracted with ether to remove unsaponified substances, then acidulated with hydrochloric acid. The precipitated oil is collected with chloroform and the chloroform solution extracted with 75 cc. and then 50 cc. of a 10% sodium carbonate solution. The carbonate solution is extracted with 100 cc. of petroleum ether, then acidulated with hydrochloric acid. The precipitated acid is collected with ether and the ether solution dried over anhydrous calcium sulfate. The ether is removed by distillation and the residual oil is dried in a thin layer in high vacuum. The resulting products, diethoxymandelic acid weighed 15.1 g. (62.9%) of theory and had the appearance of transparent glass. The diethoxymandelic acid may be crystallized from benzene upon prolonged cooling; M. P. 113–114° C., but the original glassy product is suitable for all practical purposes.

*Analysis.*—Calculated for $C_{12}H_{16}O_5$: C, 60.00; H, 6.70. Found: C, 60.03; H, 7.10.

Modifications may be made in carrying out the present invention without departing from the spirit and scope thereof and the invention is to be limited only by the appended claims.

We claim:

1. The process that comprises reacting 3,4-diethoxymandelic acid nitrile with anhydrous hydrochloric acid in an absolute lower aliphatic alcohol medium at room temperature for approximately forty to one-hundred hours, recovering the 3,4-diethoxymandelic acid alkyl esters thus formed and hydrolyzing the latter compound at room temperature to 3,4-diethoxymandelic acid.

2. The process that comprises reacting 3,4-diethoxymandelic acid nitrile with anhydrous hydrochloric acid in an absolute ethyl alcohol medium at room temperature for approximately forty to one-hundred hours, recovering 3,4-diethoxymandelic acid ethyl ester and hydrolyzing the latter compound in an alkali medium at room temperature to form 3,4-diethoxymandelic acid.

3. The process that comprises reacting 3,4-diethoxymandelic acid nitrile with anhydrous hydrochloric acid in an absolute lower aliphatic alcohol medium at room temperature for approximately forty to one-hundred hours and recovering the 3,4-diethoxymandelic acid alkyl ester thus formed.

4. The process that comprises reacting 3,4-diethoxymandelic acid nitrile with anhydrous hydrochloric acid in an absolute ethyl alcohol medium at room temperature for approximately forty to one-hundred hours and recovering the 3,4-diethoxymandelic acid ethyl ester thus formed.

JOHN WEIJLARD.
MAX TISHLER.

REFERENCES CITED

The following references are of record in the file of this patent:

UNITED STATES PATENTS

| Number | Name | Date |
| --- | --- | --- |
| 895,316 | Turner et al. | Aug. 4, 1908 |

FOREIGN PATENTS

| Number | Country | Date |
| --- | --- | --- |
| 14,886 | Great Britain | 1895 |

OTHER REFERENCES

Kraunichfeldt: "Ber. Deut. Chem.," vol. 46, pp. 4023–4024 (1913).

Kindler: "Ber. Deut. Chem.," vol. 74B, pp. 315–321 (1941).

Schwartz et al.: Canadian Journal of Research, vol. 19B, pp. 150–152 (1941).

Fieser et al.: "Organic Chemistry," Heath and Co., Boston, Mass., 1944, p. 182.